United States Patent
Lujan

(10) Patent No.: US 11,108,245 B1
(45) Date of Patent: Aug. 31, 2021

(54) ELECTRIC BATTERY CHARGER SYSTEM AND METHOD

(71) Applicant: Benjamin Lujan, Tracy, CA (US)

(72) Inventor: Benjamin Lujan, Tracy, CA (US)

(*) Notice: Subject to any disclaimer, the term of this patent is extended or adjusted under 35 U.S.C. 154(b) by 205 days.

(21) Appl. No.: 16/523,985

(22) Filed: Jul. 26, 2019

Related U.S. Application Data

(60) Provisional application No. 62/712,215, filed on Jul. 31, 2018.

(51) Int. Cl.
*H02J 7/00* (2006.01)
*H02M 3/156* (2006.01)
*B60L 53/14* (2019.01)

(52) U.S. Cl.
CPC .......... *H02J 7/00* (2013.01); *B60L 53/14* (2019.02); *H02M 3/156* (2013.01); *H02J 2207/10* (2020.01)

(58) Field of Classification Search
CPC ........ H02J 7/00; H02J 2207/10; H02M 3/156; B60L 53/14
See application file for complete search history.

(56) References Cited

U.S. PATENT DOCUMENTS

| | | | |
|---|---|---|---|
| 5,076,755 A * | 12/1991 | Okada | F16C 17/20 415/17 |
| 7,064,513 B2 * | 6/2006 | Fenley | F02D 41/0205 318/700 |
| 2019/0245409 A1 * | 8/2019 | Alcon | H02K 53/00 |

* cited by examiner

*Primary Examiner* — Vuthe Siek
(74) *Attorney, Agent, or Firm* — Roark IP

(57) ABSTRACT

Disclosed herein is an electric battery charger system and method which may be used with electrical equipment such as an electric vehicle to improve the efficiency of operation. The charger system includes a DC motor operated by a car battery or other power source and a generator (e.g., turbine generator) to power a traction battery of the electric vehicle for recharging. In one embodiment, the charger system may have a single shaft running between the motor and generator with blades on the shaft to cool the operation of the charger system. In another embodiment, a coupler assembly is located between the motor and generator to drive the shaft of the generator. In another embodiment, the charger system may include fans having interlocking, non-contact blades which are kept apart by magnets located on the blades. A first fan is turned by the DC motor and is configured to drive a second fan which turns a shaft of the generator to create power for charging the traction battery.

20 Claims, 15 Drawing Sheets

ELECTRIC BATTERY CHARGER SYSTEM AND METHOD

CROSS-REFERENCE TO RELATED APPLICATIONS

This application claims the benefit of U.S. Provisional Patent Application Ser. No. 62/712,215, filed Jul. 31, 2018 which is incorporated herein by reference.

FIELD OF THE DISCLOSURE

The present disclosure relates to electric car battery chargers and, more particularly, it relates to electric battery chargers for electrically driven equipment such as vehicles.

BACKGROUND OF THE DISCLOSURE

An electric vehicle; also called an EV, uses an electric motor for propulsion. An electric vehicle may be powered through a collector system by electricity from off-vehicle sources, or may be self-contained with a battery, solar panels or an electric generator to convert fuel to electricity. EVs include, but are not limited to, road and rail vehicles, surface and underwater vessels, electric aircraft and electric spacecraft.

SUMMARY

Aspects of the disclosure may include an electric battery charger comprising: a motor connected through a shaft to a generator, wherein the motor is capable of producing rotations in a shaft in the range of approximately 600 to 1800 rotations per minute (rpm) with an input of approximately 1.5 volts; and the shaft extending from inside the motor to inside the generator forming a rotor for both the motor and the generator to enable production of approximately 60 volts. The electric battery charger further comprising: a pair of blades mounted on the shaft and capable of directing airflow towards both the motor and the generator. The electric battery charger may have blades that are wing foil shaped and wherein the blades are spaced a gap distance of at least one inch along the shaft. The charge may receive power at the motor from an auxiliary car battery and/or a DC to DC converter. The charger of may further comprise: a controller capable of monitoring and controlling the speed of the motor. The charger may receive inputs capable of receiving power from a plurality of sources. The charger may further comprise a plurality of outlets capable of providing power to a plurality of electrical products. The charger may further comprise: an outlet capable of connecting the generator to an electric vehicle traction battery to enable charging of the electric vehicle traction battery.

Aspects of the disclosure may further include an electric battery charger comprising: a motor capable of producing rotations in a first shaft in the range of approximately 600 to 1800 rotations per minute (rpm) with an input of approximately 1.5 volts; the first shaft configured to turn a first coupler; a second shaft capable of being turned by a second coupler; an elastic third coupler located between the first and second couplers to form an interlocking configuration with the first blades so that that first mounted magnets are capable of repelling and driving the second mounted magnets; and a generator coupled to the second shaft and capable of producing approximately 60 volts.

Aspects of the disclosure may further include an electric battery charger comprising: a motor capable of producing rotations in a first shaft in the range of approximately 600 to 1800 rotations per minute (rpm) with an input of 1.5 volts; the first shaft configured to turn a first fan having a first set of blades with first mounted magnets; a second shaft capable of being turned by a second fan having a second set of blades each with second mounted magnets, wherein the second blades are positioned in an interlocking, non-contact configuration with the first blades so that that first mounted magnets are capable of repelling and driving the second mounted magnets; and a generator coupled to the second shaft and capable of producing 60 volts. The charger may have first and second fan blades are aerodynamically shaped with a twisting, turning shape. The charger may receive of power for the motor from an auxiliary car battery and/or a DC to DC converter. The charger may further comprise a controller capable of monitoring and controlling the speed of the motor. The charger may have a first set of blades shaped to create airflow towards the motor and a second set of blades that are shaped to create airflow towards the generator. In the charger the first shaft may have a first square shaped end and the second shaft may have a second square shaped end. In the charger the first and second fans may further comprise: a first hub with a first internal, square shaped center which is integrally coupled to the first fan blades and is capable of being mounted on the first square shaped end of the first shaft; and a second hub with a second internal, square shaped center which is integrally coupled to the second fan blades and is capable of being mounted on the first square shaped end of the first shaft. The changer may further comprise an outlet capable of connecting to an electric vehicle traction battery to enable charging of the electric vehicle traction battery.

Aspects of the disclosure may further include a method of recharging an electric battery comprising: driving a shaft by a motor in the range of approximately 600 to 1800 rotations per minute (rpm) with an input of 1.5 volts to rotate a rotor in a generator; and producing 60 volts at a generator coupled to and being driven by the shaft. The method of may further include: a pair of wing foil shaped blades are mounted on the shaft and capable of directing airflow towards the motor and the generator.

Aspects of the disclosure may further include a method of recharging an electric battery comprising: rotating a first shaft of a motor wherein the first shaft has a coupler in the range of approximately 600 to 1800 rotations per minute (rpm) with an input of approximately 1.5 volts; receiving at a second shaft having a second coupler a driving force from the first coupler, wherein the first and second couplers have an elastic coupler located in between to form an interlocking configuration; and producing approximately 60 volts at a generator coupled to and being driven by the second shaft.

Aspects of the disclosure may further include a method of recharging an electric battery comprising: rotating a first shaft by a motor wherein the first shaft has a first fan with a plurality of first mounted magnets in the range of approximately 600 to 1800 rotations per minute (rpm) with an input of 1.5 volts; receiving at a second shaft having a second fan with a plurality of second mounted magnets a driving force from the first mounted magnets, wherein the second blades are positioned in an interlocking, non-contact configuration with the first blades so that that first mounted magnets are capable of repelling and driving the second mounted magnets; and producing 60 volts at a generator coupled to and being driven by the second shaft. The first and second fan blades of may be aerodynamically shaped. Power may be received at the motor from an auxiliary vehicle battery and/or a DC to DC converter. The method may further comprise monitoring and controlling the speed of the motor with a controller. The first set of blades may be shaped to create airflow towards the motor and the second set of blades may be shaped to create airflow towards the generator. The first shaft may have a first square shaped end and the second shaft may have a second square shaped end. The first and second fans may further comprise: a first hub with a first internal, square shaped center which is integrally coupled to the first fan blades and is capable of being mounted on the first square shaped end of the first shaft; and a second hub with a second internal, square shaped center which is integrally coupled to the second fan blades and is capable of being mounted on the first square shaped end of the first shaft. The charger may further receive power at a plurality of inputs from a plurality of sources. The charger may further provide power to a plurality of electrical products from a plurality of outlets. The method may further comprising: charging an electric vehicle traction battery with the generator.

BRIEF DESCRIPTION OF THE DRAWINGS

The embodiments of this disclosure are illustrated by way of example. In some instances, well-known structures and devices are shown in block diagram form in order to facilitate describing various techniques.

DETAILED DESCRIPTION

Figure 1:
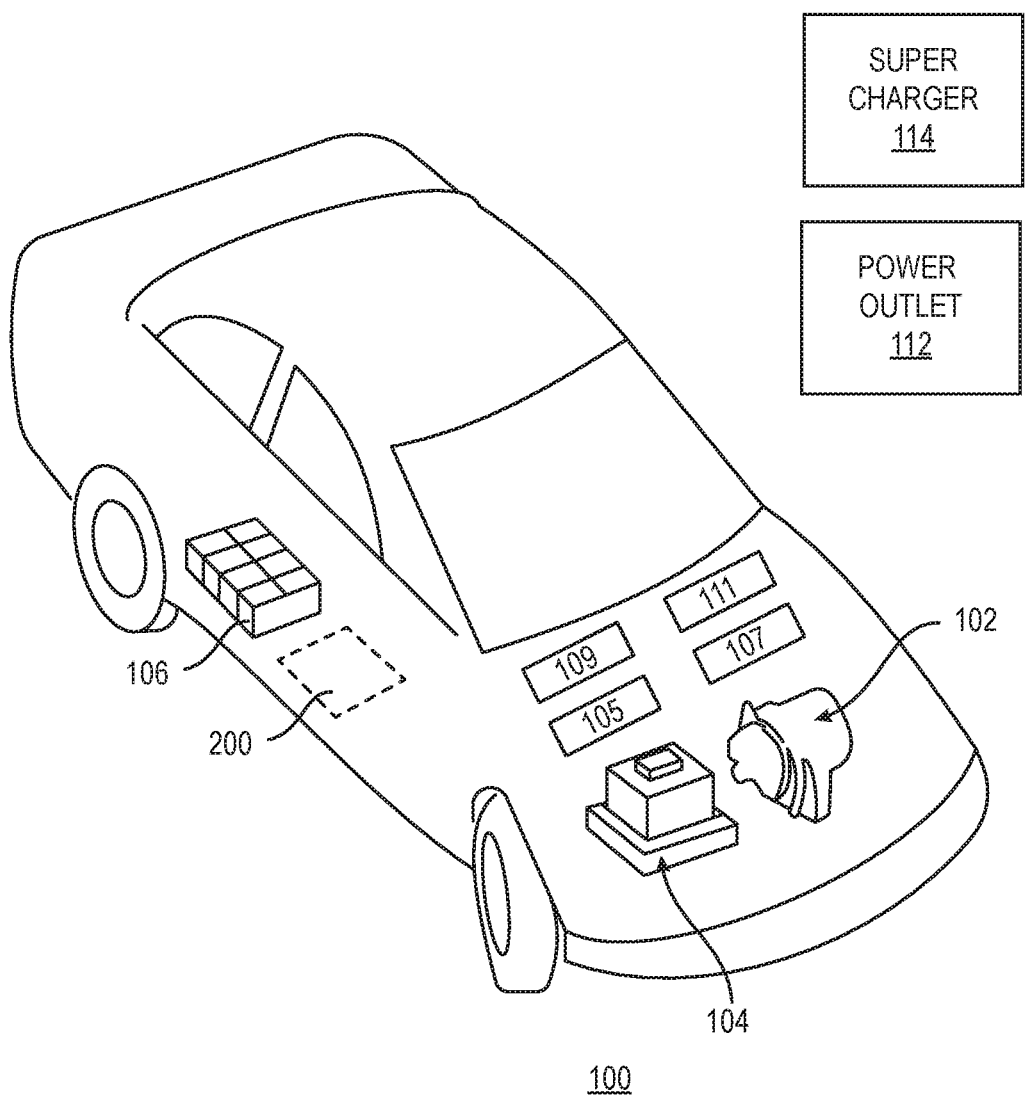
FIG. 1 shows an electric vehicle incorporating a n electric car battery charger system of the present disclosure.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough, and will fully convey the scope of this disclosure to those skilled in the art. Various changes, modifications, and equivalents of the systems, apparatuses, and/or methods described herein will likely suggest themselves to those of ordinary skill in the art. Same elements, features, and structures are denoted by same reference numerals throughout the drawings and the detailed description, and the size and proportions of some elements may be exaggerated in the drawings for clarity and convenience.

FIG. 1 shows an electric vehicle 100 incorporating the electric battery charger system 200 of the present disclosure. The vehicle may be a car, truck or other type of vehicle. Electric traction motor 102 uses power from a traction battery 106 to drive the vehicle's wheels. Electric traction motor 102 is connected to a vehicle auxiliary battery 104 which is typically a 12 or 24 volt (V) lead acid battery used to power the system that runs the vehicle accessories components such as the lights, entertainment system, and heating/cooling system. This vehicle auxiliary battery 104 is kept charged by a direct current (DC)-DC converter 105. The DC-DC converter device 105 converts higher-voltage DC power (e.g., 350 volts) from a traction battery 106 to the lower voltage, 12 volt or 24 volt DC power. Power electronics controller 107 manages the flow of electrical energy delivered by the traction battery 106, controlling the speed of the electric traction motor 102 and the torque it produces. In some embodiments, the vehicle 100 may have a regenerative brake energy recovery system 109 which is capable of storing power from the kinetic energy obtained by the braking of the vehicle 100. In some embodiments, the vehicle may obtain power from a solar panel energy system 111 located on the exterior surface of the vehicle 100. The vehicle 100 may be connected to power outlet 112 for charging. Power outlet 112 maybe, for example, 15V, 60V, 120V or 240V. 120V is typically used for "Level 1" recharging and 240V for "Level 2" recharging of traction battery 106. Supercharger 114 is a high power direct current (DC) "Level 3" recharger using ultrahigh power 480V circuits for recharging with connection to traction battery 106 (e.g., Tesla® Supercharger).

Figure 2:
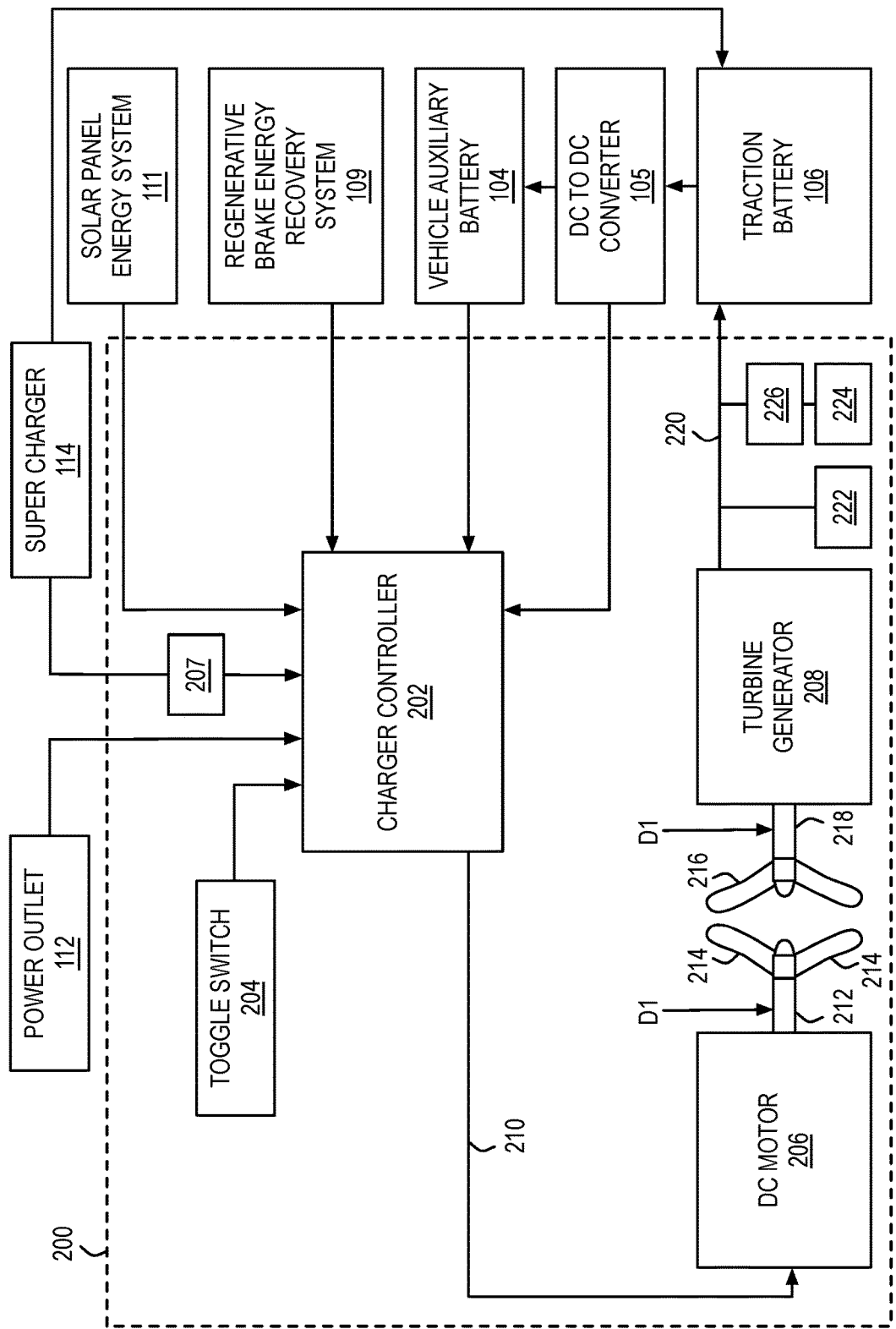
FIG. 2 shows a detailed view of the electric battery charger system 200.

FIG. 2 shows a detailed view of the electric battery charger system 200. The electric battery charger system 200 may function as a recharger for the traction battery 106 of electric vehicle 100. The battery charger system 200 may be a separate, detachable system mounted in a case. In an alternative embodiment, electric battery charger system 200 may be integrated into the vehicle 100. In another embodiment, the battery charger system 200 may be in a case with a handle for portable operation. The electric battery charger system 200 may draw power from a variety of sources. In a first case, power is drawn from the vehicle auxiliary battery 104. Vehicle auxiliary battery 104 is connected to a charger controller 202. Charger controller 202 may be made up of a microprocessor, memory, input/outputs and other electronic elements to control the operation of the electric battery charger system 200. The charger controller 202 may provide power to and control the speed of DC motor 206. The charger controller 202 may control the speed of DC motor 206 through a pulse width modulated signal. Toggle switch 204 is connected to charge controller 202 and may be a flat terminal, heavy duty switch which is used to turn on and off the electric battery charger system 200 by the vehicle operator.

Other power sources besides vehicle auxiliary battery 104 may provide power to the electric battery charger system 200. DC to DC converter 105 which is connected to the traction battery 106 may provide power to DC motor 206. Regenerative brake energy recovery system 109 may transfer kinetic energy from the braking of the vehicle 100 to the DC motor 206. Solar panel energy system 111 may transfer power collected from solar panels mounted on the exterior of the vehicle 100 to the DC motor 206. Power outlet 112 may provide power at lower voltages while supercharger 114 may also provide power at lower voltages after being converted through DC to DC converter 207. In some embodiments, DC motor 206 may draw power individually or from any combination of the vehicle auxiliary battery 104, DC to DC converter 105, regenerative brake energy recovery system 109, solar panel energy system 111, power outlet 112 and/or supercharger 114.

DC motor 206 drives generator 208 to provide amps (e.g., approximately 15 to 30 amps) to traction battery 106 for optimal performance. Charger controller 202 may operate at low voltages (e.g., 1.8V, 3V, 5V, 6V, or 12V). DC motor 206 may be, for exemplary purposes, a 12 V or 24 V, 300 amperes ("amp" or "A") motor having a stator with windings driving a rotor with magnets. Ideally, DC motor 206 will operate at approximately 1.5V and draw in a range of approximately 1.8 amps to 23 amps off of one of the power sources such as the vehicle auxiliary battery 104 through connection 210 (e.g., 18 gauge electrical wire). In alternative embodiments, the draw by DC motor 206 may range up to and include approximately 23.4 amps.

DC motor 206 turns first shaft 212. On the distal end of shaft 212 from DC motor 206, first fan 214 is mounted. First fan 214 drives second fan 216 which is mounted on the distal end 218a of second shaft 218 from generator (e.g., turbine generator) 208. First fan 214 and second fan 216 are intermingled and interlocked but not in physical contact with each other. Shafts 212 and 218 may have a diameter D1 in the range of approximately ⅜ inch to approximately ½ inch. Ideally, both shafts are substantially the same diameter but they may differ having a first diameter different from a second diameter. Shaft 218 is part of generator 216 which may be used to power and recharge the electric traction battery 106 through connection 220. Connection 220 may be, for example, 20 gauge wire. Generator 208 may be a 12V or 24V DC permanent magnet motor generator (e.g., WindZilla™). The generator 208 may operate in a range of approximately 5V to approximately 60V generate current which can be used to recharge the electric traction battery 106 while the vehicle 100 is stationary or running. Connection 220 may provide power to a 4 plug AC outlet (e.g., 60V outlets) 222 located between the generator 208 and traction battery 106. Connection 220 may also provide power to a 4 plug DC outlet (e.g., 60V outlets) 224 through converter 226.

Figure 3:
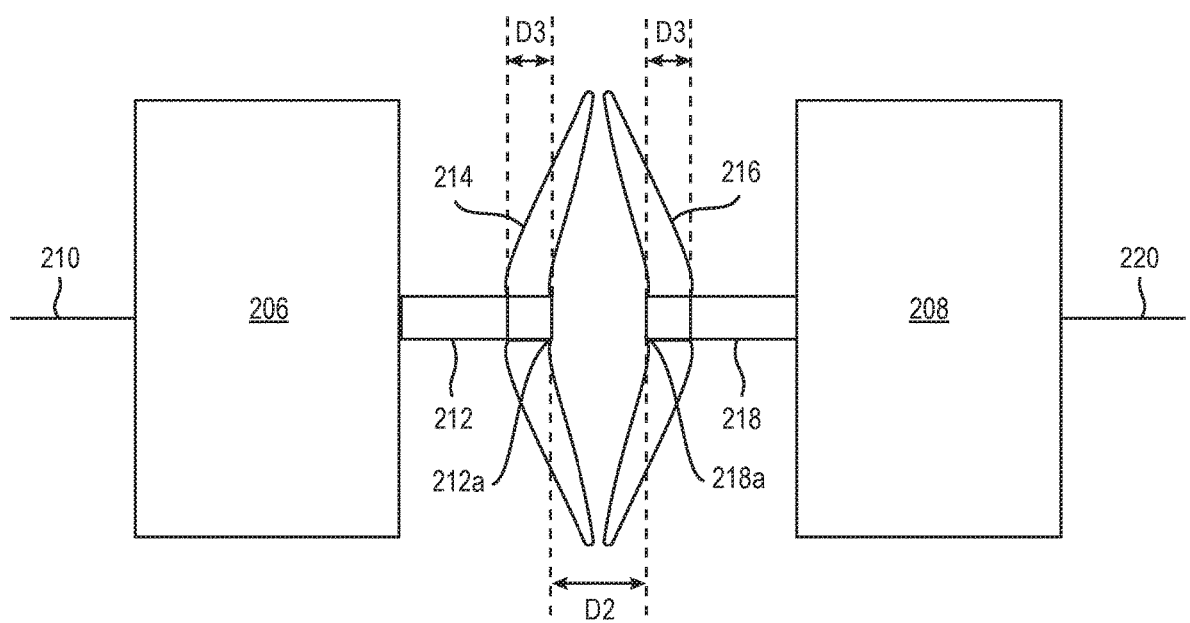
FIG. 3 shows a side view of fans located in the electric battery charger system 200.
Figure 4A:
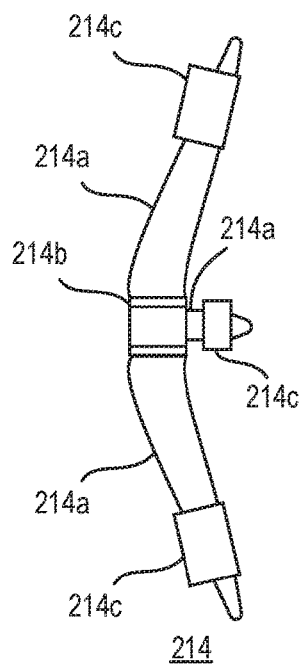
FIGS. 4A and 4B shows a side view of the first fan 214 and second fan 216 of the charger system 200.
Figure 4B:
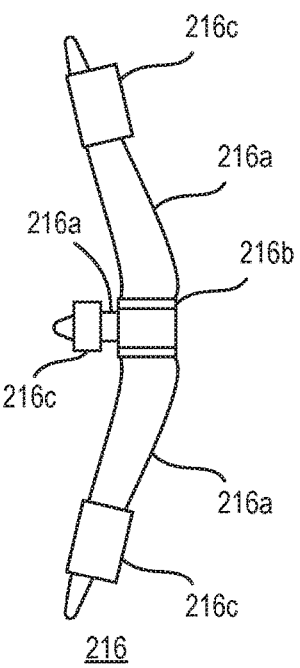
Figure 4C:
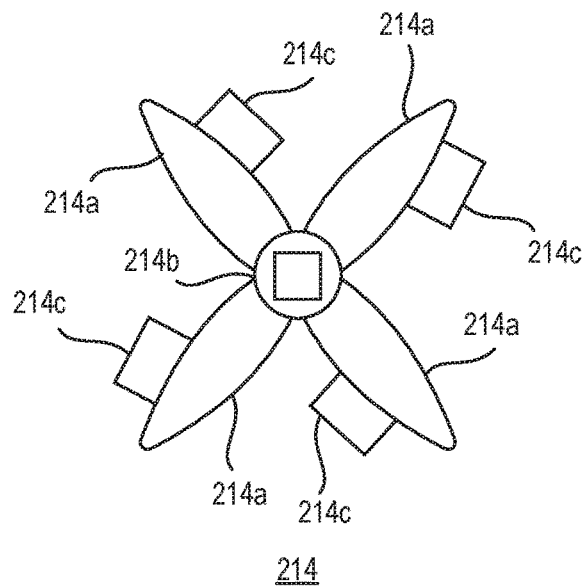
FIG. 4C shows a frontal view of a first fan 214 and FIG. 4D shows a frontal view of a second fan 216.
Figure 4D:
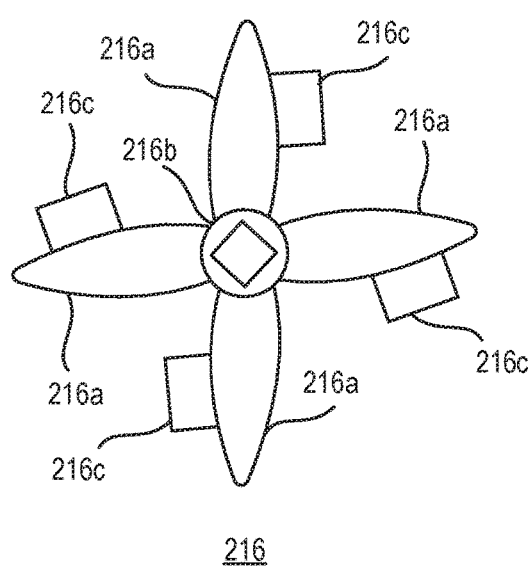

FIG. 3 shows a close up, side view of the fans 214 and 216 configured in a intermingled and interlocking but non-contact relationship. Shafts 212 and 218 are spaced approximately ½ inch apart (reference D2 in FIG. 3). Each shaft 212 and 218 may have a squared configuration extending a distance D3 (e.g., approximately 1 inch) inward from each of the distal ends 212a and 218a of shafts 212 and 218 for the squared off internal hubs of fans 214 and 216 to be securely mounted thereon. FIGS. 4A and 4B show a side view of the first fan 214 and second fan 216. FIG. 4C shows a frontal view of a first fan 214 and FIG. 4D shows a frontal view of a second fan 216. Fan 214 is made up of a plurality of blades 214a (e.g., 4 blades) radiating out from an internal hub 214b which are configured to have an aerodynamic shape to cut through the air and reduce drag. Each blade 214a has a magnet 214c attached on the distal end of each of the blades 214a. Magnets 214c have positive and negative poles. Fan 216 is similarly made up of a plurality blades 216a (e.g., 4 blades) radiating out from a hub 216b which are configured to be aerodynamic and cut through the air and reduce drag. By using fan blades 214 and 216 no power is lost to mechanical turning friction such as that which occurs when ball bearings are used. In addition, the fans 214 and 216 provide a cooling effect for the charging system 200 to potentially remove the need for a cooling fan in the system 200. Each blade 216a has a magnet attached on the distal end of each of the blades 216a. Magnets 216c have positive and negative poles. Blades 214a and 216a may be approximately 3 inches in length with a width of ½ inch and a thickness of ⅜ inches. The blades 214 and 216 may be made of aluminum, steel or other durable, lightweight materials. The blades may be configured with indentations which allow magnets (214c, 216c) to be embedded and fitted into place. In one embodiment, the magnets 214c and 216c may be flush with the surface of the fan blades 214a, 216a for aerodynamic purposes. Also, in an alternative embodiment, instead of mounting the fan blades 214a, 216a on hubs 214b, 216b, the fan blades 214a and 216a may be welded directly to shafts 212 and 218.

Figure 4E:
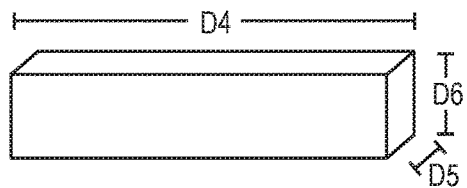
FIG. 4E shows a magnet in detail (either magnets 214c or 216c).
Figure 4F:
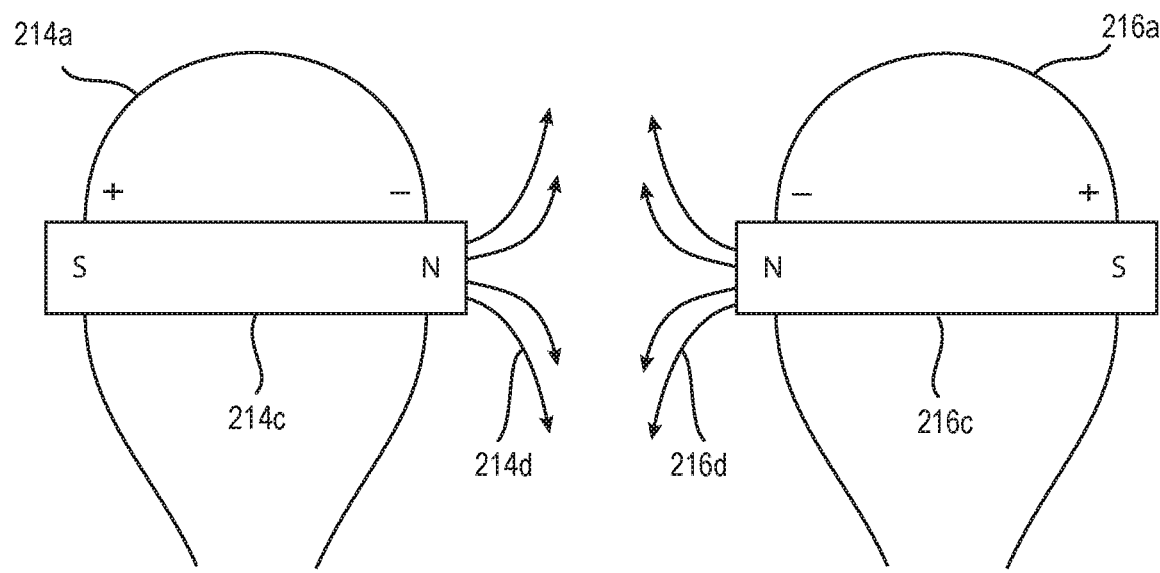
FIG. 4F shows an example of magnet 214c in position with magnet 216c.

FIG. 4E shows magnets 214c and 216c which may be inserted into the surface of the blades 214a and 216a. The magnets 214c and 216c may be approximately 1 inch in length (D4), approximately 0.13 inches thick (D5), approximately 0.5 inches in width (D6), and have a holding capacity of approximately 12 pounds. FIG. 4F shows, for exemplary purposes, how magnets 214c are arranged on blades 214a to have the end with the same polarity (e.g., negative and negative) as the corresponding magnets 216c as arranged on blades 216c so that lines of flux 214d and 216d are away from each other.

Figure 4G:
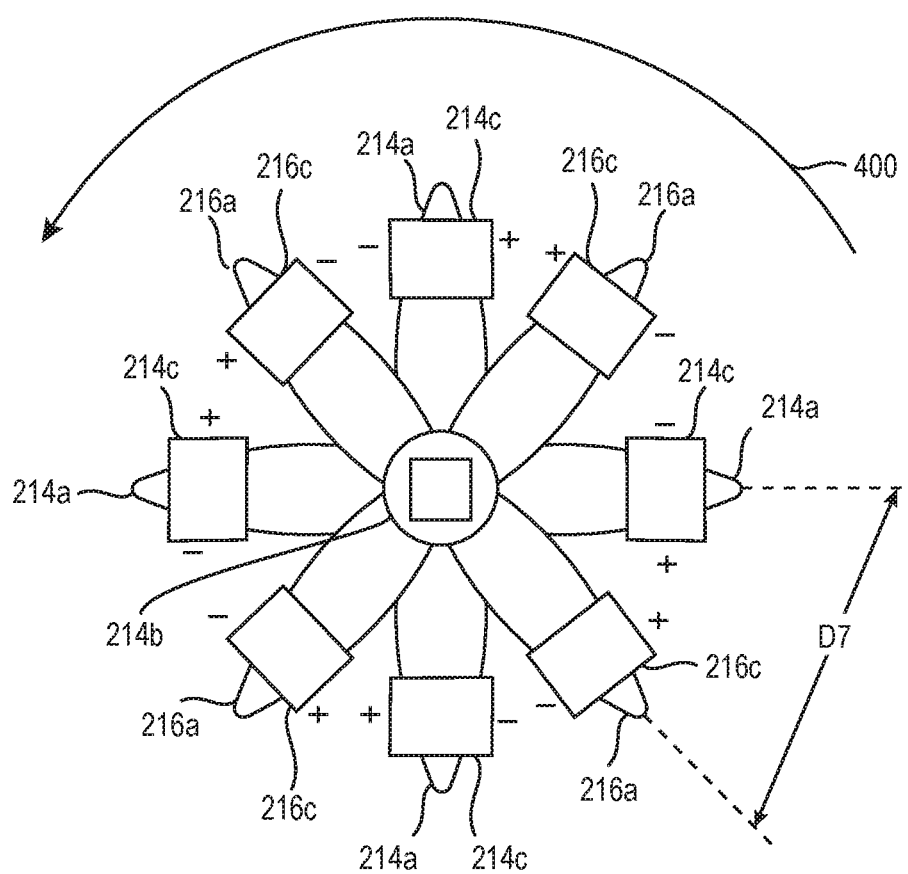
FIG. 4G shows first fan 214 and second fan 216 in operating position viewed from motor 206.

FIG. 4G shows a side view of first fan 214 and second fan 216 in operating position viewed from motor 206 with arrow 400 showing a direction of turning operation of first fan 214 (although it can turn clockwise as well). Viewing FIG. 3 and FIG. 4G, it is shown that the blades of fans 214 and 216 are in an intermingled (and interlocked) configuration but kept spaced part by the same polarity of adjoining poles of magnets 214c and 216c. The fan blades 214a, 216a with magnets 214c and 216c are spaced apart D7 in a range of approximately 2 to 3 inches. Shaft 212 is driven by motor 206 to operate in a range of approximately 600 to 1800 rotations per minute (rpms) and ideally approximately 900 rpms. Fan 216 will absorb the mechanical energy generated by the turning of fan 214 by the force exerted by magnets 214c interacting on magnets 216c to create rotational motion in shaft 218. Shaft 218 will therefore also rotate in a range of approximately 600 to 1800 rpms and ideally approximately 900 rpms. As discussed above, while turning the fans 214 and 216 will also perform a cooling function on DC motor 206 and turbine generator 208. The fan blades 214a may be configured to drive air towards DC motor 206 and fan blades 216a may be configured to drive air towards turbine generator 208.

Figure 5A:
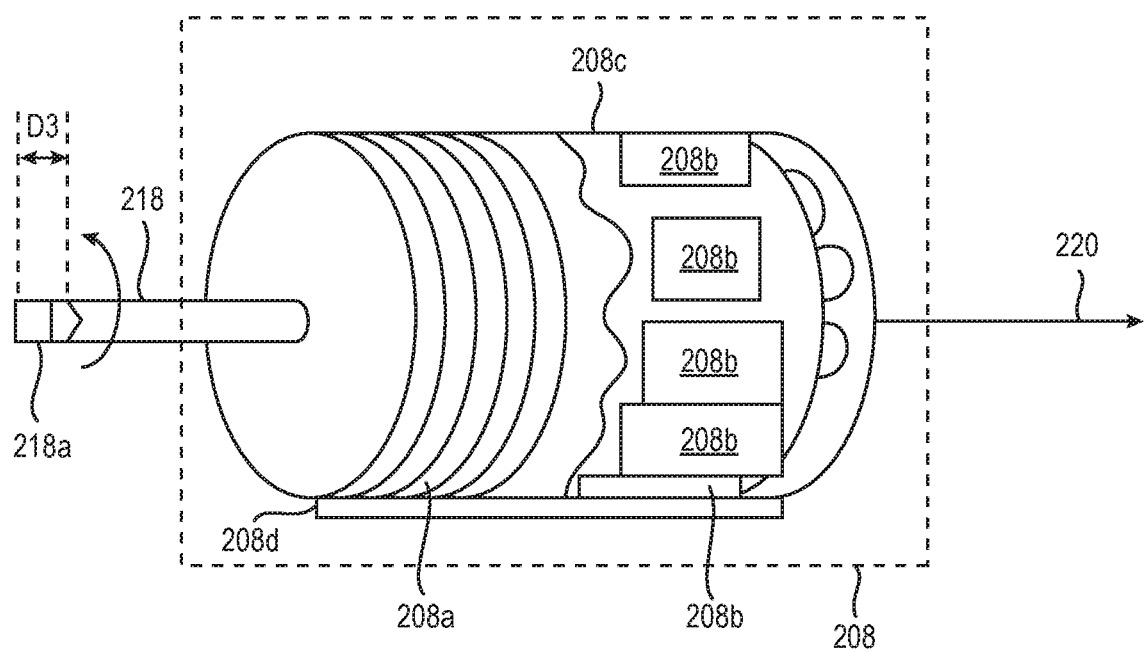
FIGS. 5A-5L shows the parts of the generator 208 (e.g., turbine generator).
Figure 5B:
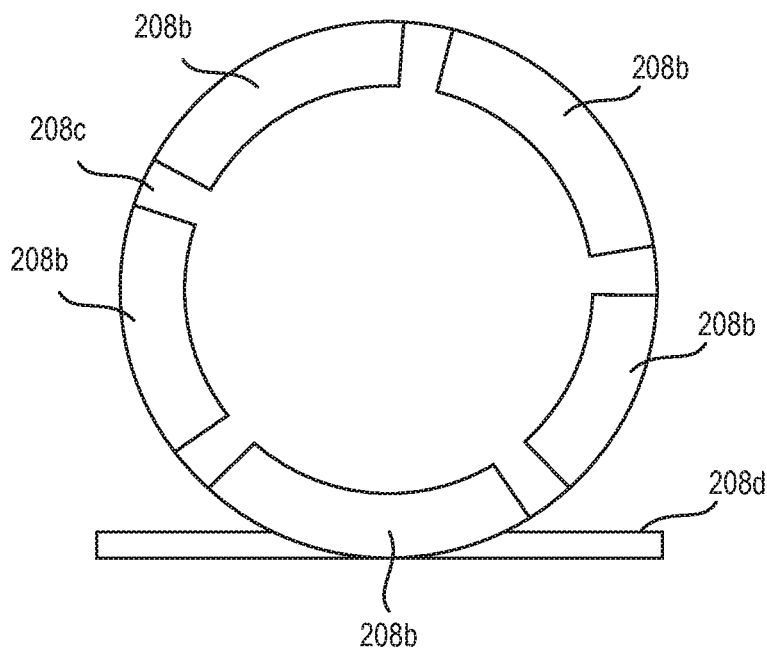
Figure 5C:
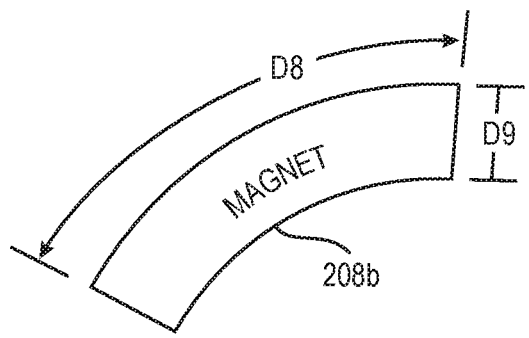
Figure 5D:
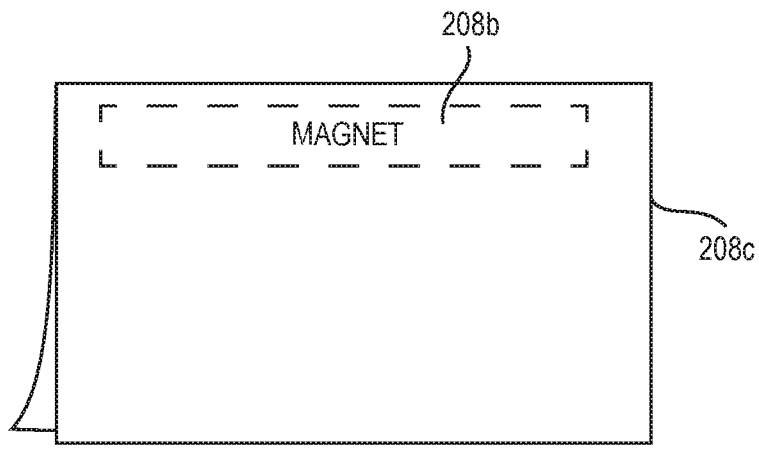
Figure 5E:
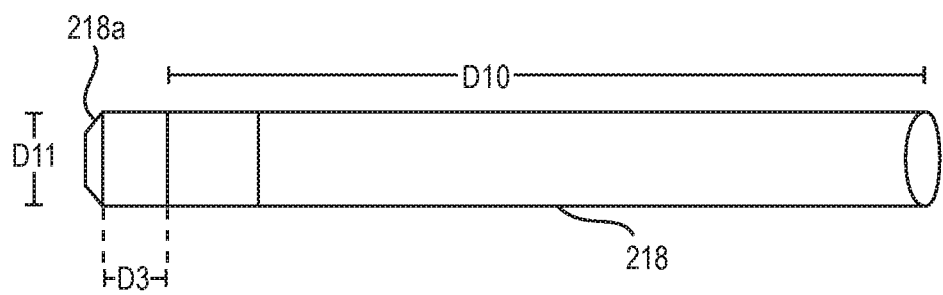
Figure 5F:
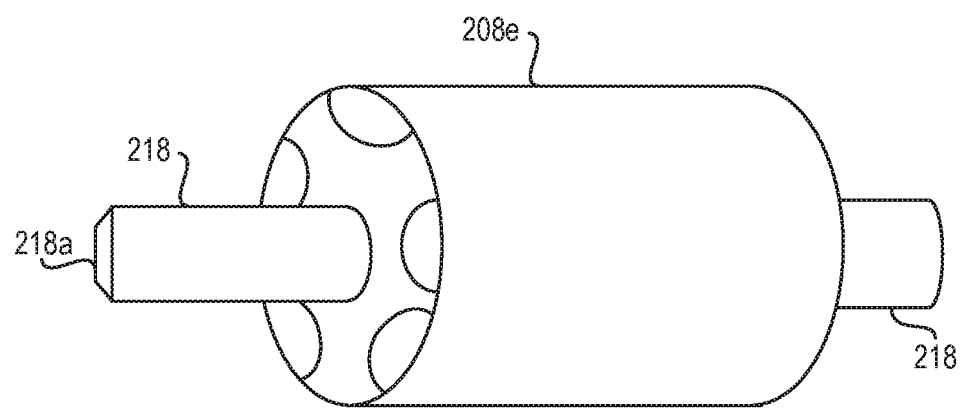
Figure 5G:
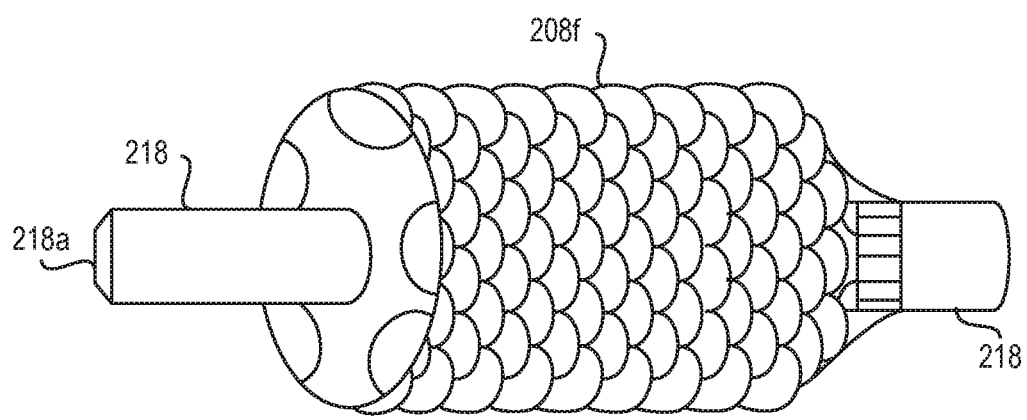
Figure 5H:
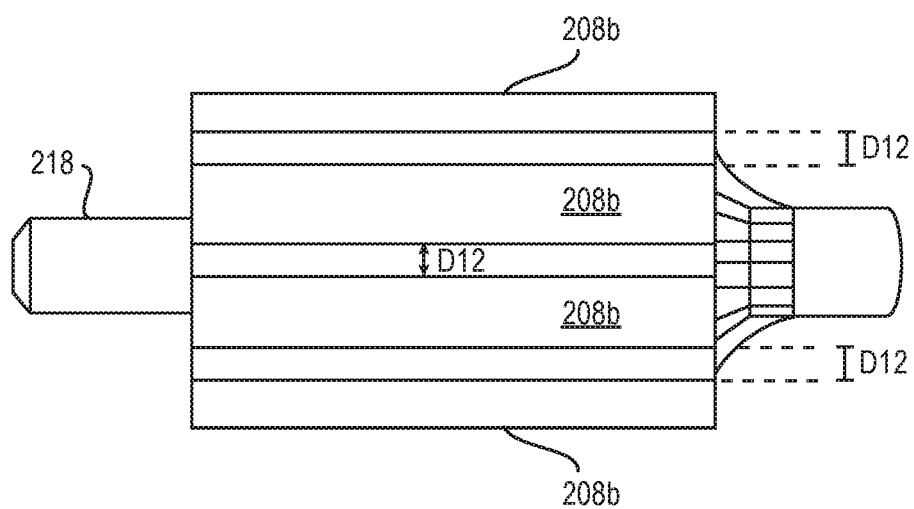
Figure 5I:
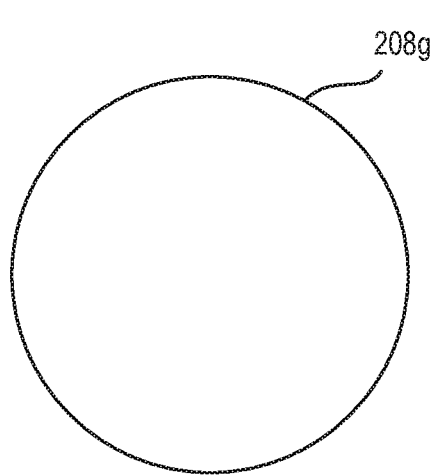
Figure 5J:
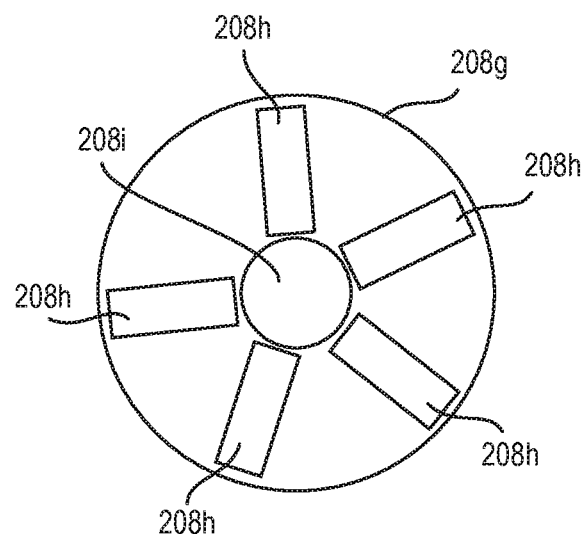
Figure 5K:
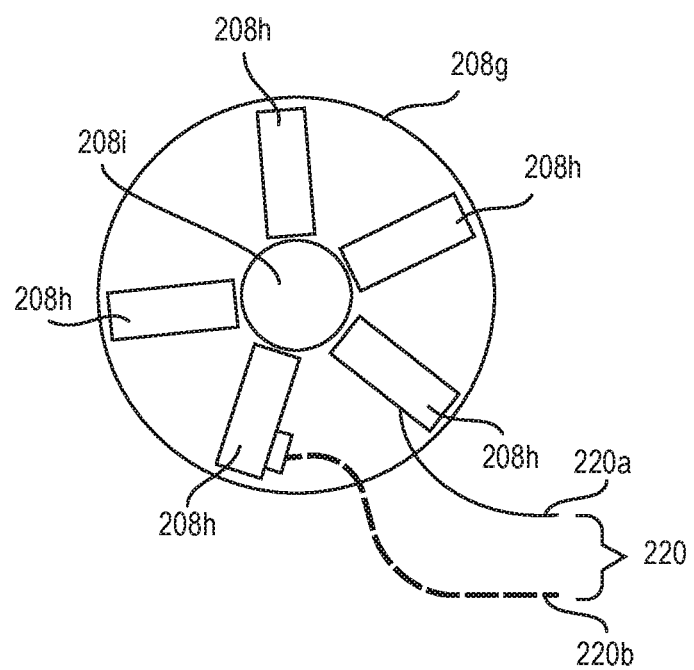
Figure 5L:
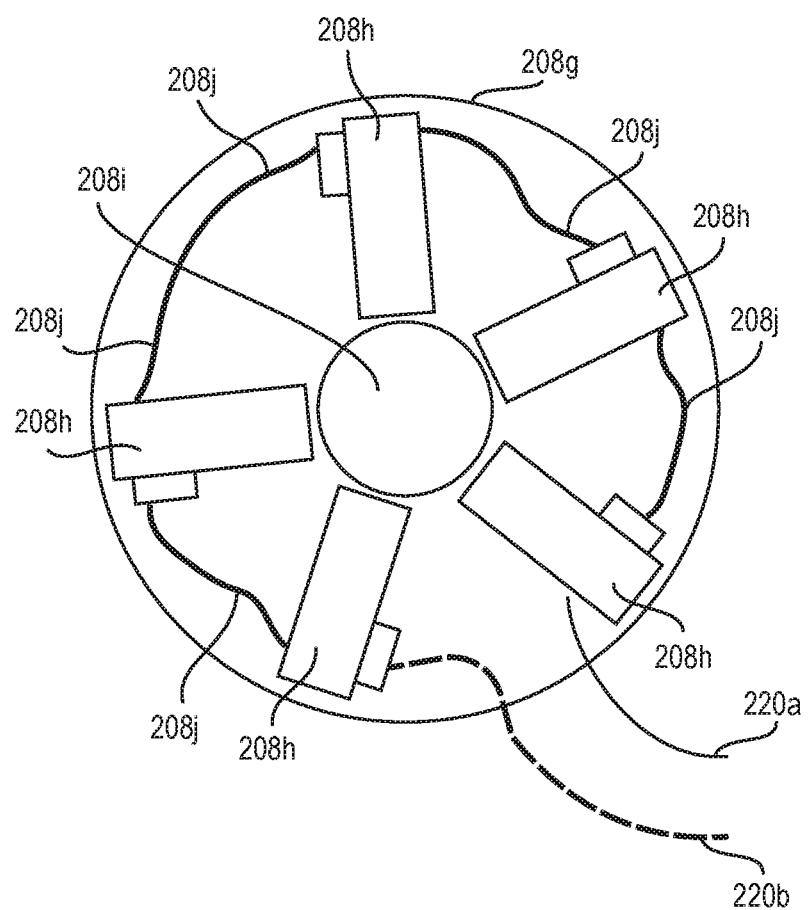

FIG. 5A shows a cutaway view of an assembled generator 208 (e.g., a turbine generator) of FIG. 2. The inner coiled copper wire 208a is rotated by shaft 218 as a source of mechanical energy within magnets 208b to produce electrical current. Both the coiled copper wire 208a and magnets 208b are located inside case 208c which is mounted on generator support 208d. The power that is produced by the generator 208 is transmitted through connection 220 to traction battery 106. For exemplary purposes, a WindZilla Max 3200 W 11 V DC permanent magnet wind turbine generator may be used for the generator 208. Generator 208 may produce in a range of approximately 5 to 240V but in normal operation will produce approximately 60V and approximately 100A or greater during most charging operations of the traction battery 106. FIG. 5B shows a side view of the magnets 208b mounted and arranged in a circle around the interior of casing 208c of the generator 208. For exemplary purposes, five magnets 208b are shown in FIG. 5B. FIG. 5C shows a perspective view of one of the plurality of magnets 208b. Reference distance D8 of the length of a magnet 208b may be in the range of approximately 2 to 3 inches and ideally approximately 2.5 inches in length. Reference D9 shows the width of the magnet 208b which may in the range of approximately ⅛ inches to ¾ inches with an ideal width of ¾ inches. FIG. 5D shows a side view of casing 208c with an outline of one of the magnets 208b inside. FIG. 5E shows a perspective view of shaft 218 having a length D10 of approximately 6 inches and a width D11 of approximately ½ inch. FIG. 5F shows a perspective view of rotor 208e mounted on shaft 218. FIG. 5G shows a perspective view of rotor windings 208f. The rotor windings 208f may be made up of 3A copper wire of 1⅛ weight. FIG. 5H shows a side view of the generator 208 with the plurality of magnets 208b separated by a distance D12 of ⅛ inches. The rotor windings 208f are kept spaced apart from stationary magnets 218b by magnetic forces which allow the rotor windings 208f to turn without any hindrance (i.e., substantially frictionless) and thus form a turbine generator. FIG. 5I is an exterior, side view of generator cap 208g. FIG. 5J is an interior, side view of generator cap 208g with a plurality of magnets 208h and shaft receptacle 208i. FIG. 5K is another view of cap 208g showing a positive (or red) wire 220a connected to magnet case and negative (or black) wire 220b also connected to the magnetic case. FIG. 5L shows connections 208j between magnets 208h.

Referring to FIG. 2, the outlets 222 and 224 of the electric battery charger system 200 allow the charger system 200 to function as a mobile, large power source. This would allow the charger system 200 to be used to power job sites and/or mobile power in cases of emergency.

Charge controller 202 controls voltage to the DC motor 206 and is also programmed to provide power when the traction battery 106 is not at full charge. When the weather gets too hot or too cold, the traction battery 106 may lose charge if idle for an extended period such as overnight. The charge controller 202 may be programmed to charge the traction battery 106 with the electric battery charger system 200 when the vehicle is off.

Figure 6:
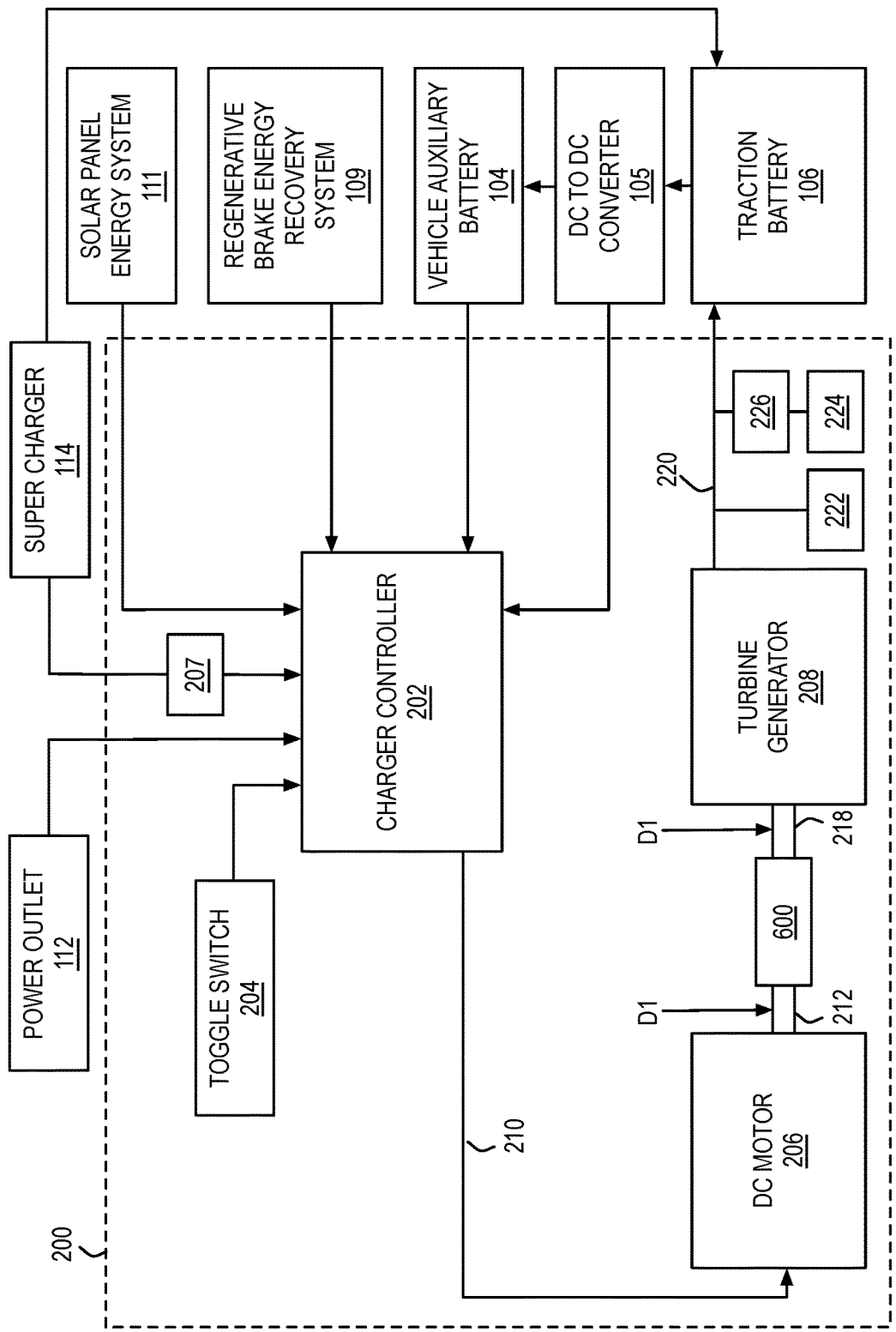
FIG. 6 shows an alternative embodiment of the electric car battery charger system 200 with a coupler 600 instead of fans.
Figure 7A:
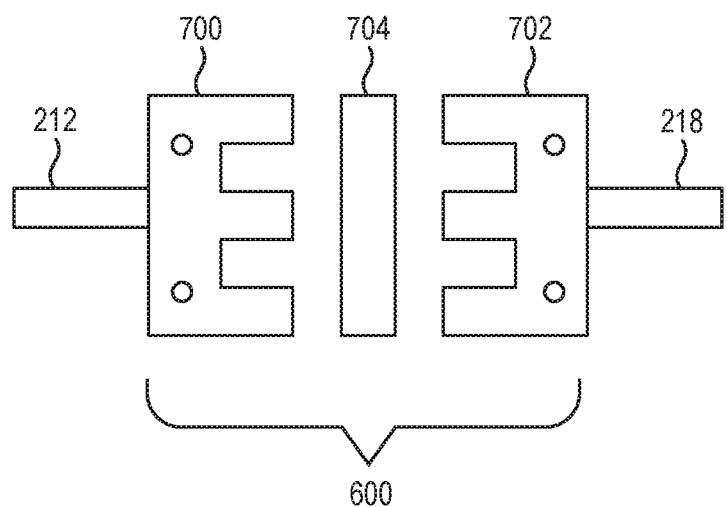
FIGS. 7A-7D shows detailed views of the parts of coupler 600.
Figure 7B:
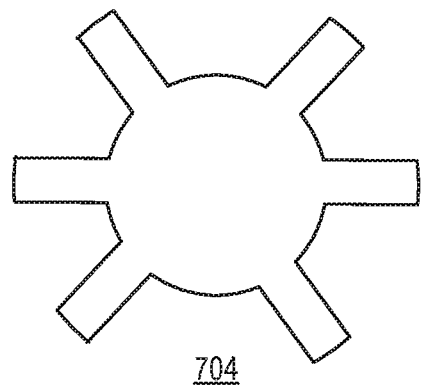
Figure 7C:
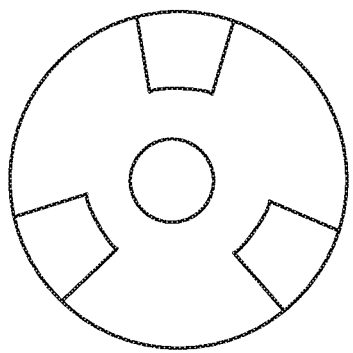
Figure 7D:
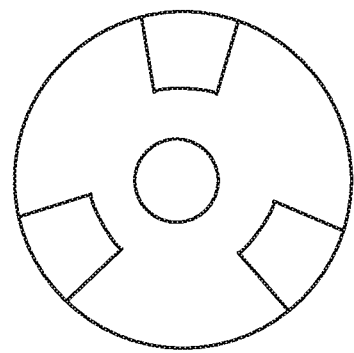

FIG. 6 shows a view of another embodiment of the electric battery charger system 200 which functions in a similar manner to that of the embodiment of FIG. 2 except with a coupler assembly 600 replacing fans 214, 216. DC motor 206 is connected through shaft 212 to coupler assembly 600. FIG. 7A shows an exploded view of shaft 212 connects to first coupler 700 (e.g., jaw coupling). First coupler 700 may be, for exemplary purposes, sintered iron 24 millimeter (mm) bore (e.g., Lovejoy L110). First coupling 700 turns hub coupling (or second coupling) 702 with an elastic spider jaw coupler 704 placed in between to make sure that first coupler 700 and second 702 do not rub while in rotation. Hub coupling 702 is mounted on shaft 218 and may be a New Chicago 44 Lovejoy L-090. Spider jaw coupler 704 may be a Buna rubber insert (e.g., such as Lovejoy Style 100 Series L100 or L099). FIG. 7B shows a front view of the elastic spider jaw coupler 704. FIG. 7C shows a front view of a first coupler 700 and FIG. 7D shows a front view of a second coupler 702. First coupler 700, second coupler 702 and the elastic, third coupler 704 form an interlocked configuration assembly for driving the turbine generator 208.

Figure 8:
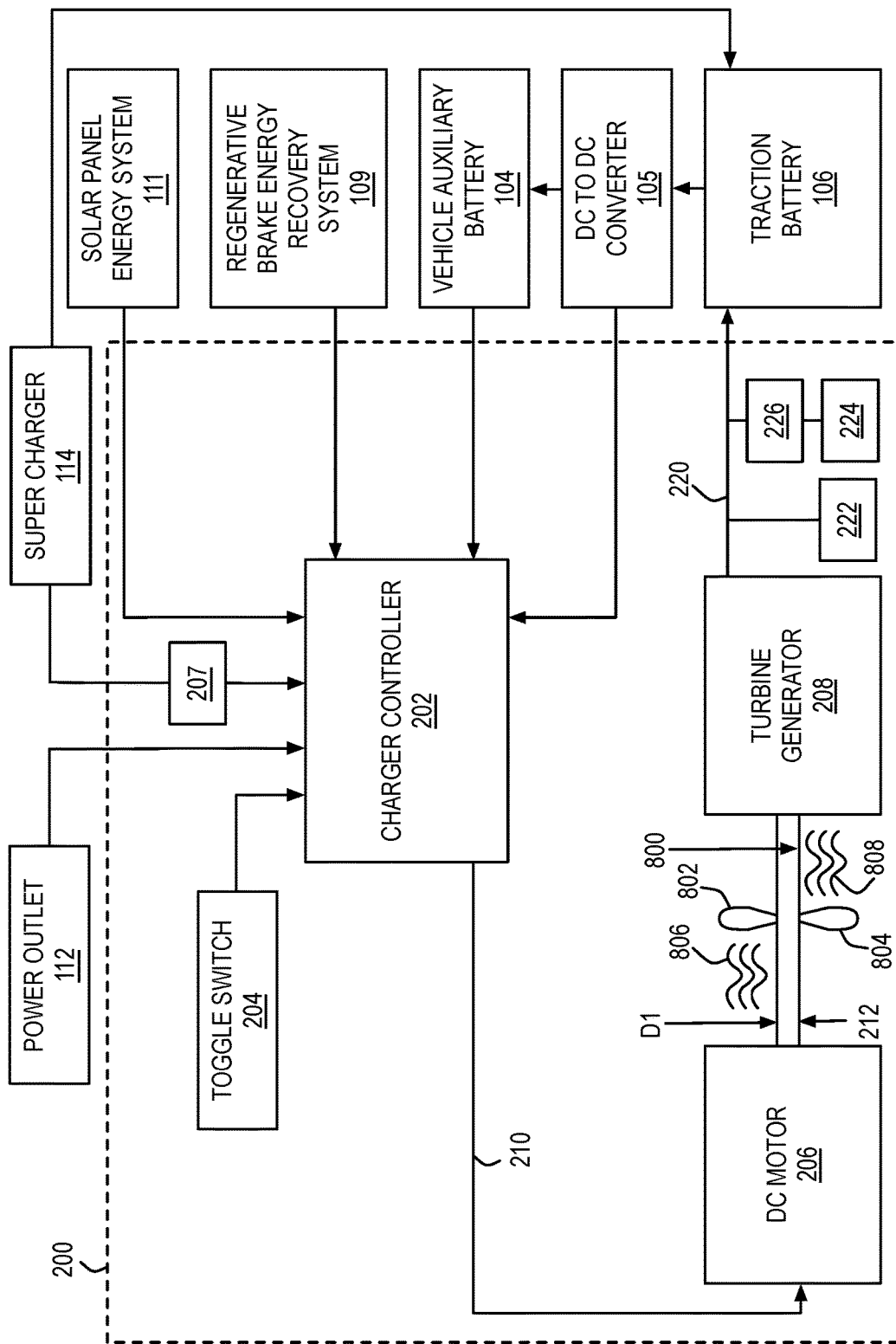
FIG. 8 shows an alternative embodiment of the electric battery charger system 200 with a single shaft.

FIG. 8 shows a view of another embodiment of the electric battery charger system 200 which functions in a similar manner to that of the embodiments of FIG. 2 and FIG. 6 except with a single shaft 800 (or direct drive) replacing the two shafts 212, 218. Shaft 800 may have a diameter in the range of approximately ⅜ inch to approximately ½ inch. Shaft 800 is driven by motor 206 to operate in a range of approximately 600 to 1800 rotations per minute (rpms) and ideally approximately 900 rpms. Shaft 800 runs between the DC motor 206 and generator 208. The rotor for the DC motor 206 may be built around shaft 800 as well as the rotor for generator 208 (e.g., turbine generator). The generator 208 of FIG. 8 will function similarly to the generator 208 of FIGS. 2 and 6. Attached to shaft 800 are blades 802 and 804. Shaft 800 may be made of steel. These blades 802 and 804 may be integrally formed with the shaft 800. In another embodiment, the blades 802 and 804 may be welded to shaft 800. Blades 802 and 804 have a wing foil shape and are able to catch wind and circulate it. Blade 802 is shaped to force airflow (represented by lines 806) towards DC motor 206 to perform a cooling effect. Blade 804 is shaped to force airflow (represented by lines 808) towards generator 208 to perform a cooling effect on this equipment as well. The cooling effect provided by these blades 802, 804 may obviate the need for an additional cooling fan or motor in the charging system 200.

Figure 9A:
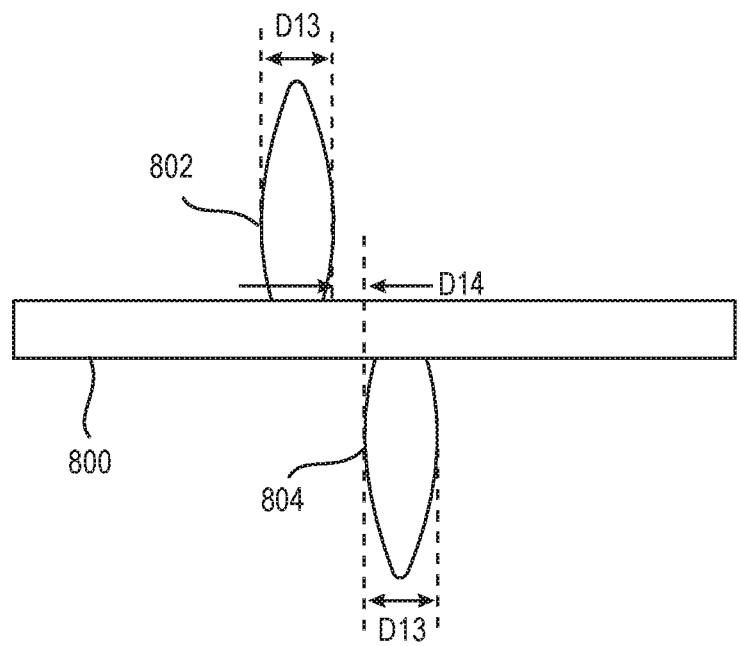
FIG. 9A shows a close up side view of the embodiment of FIG. 8
Figure 9B:
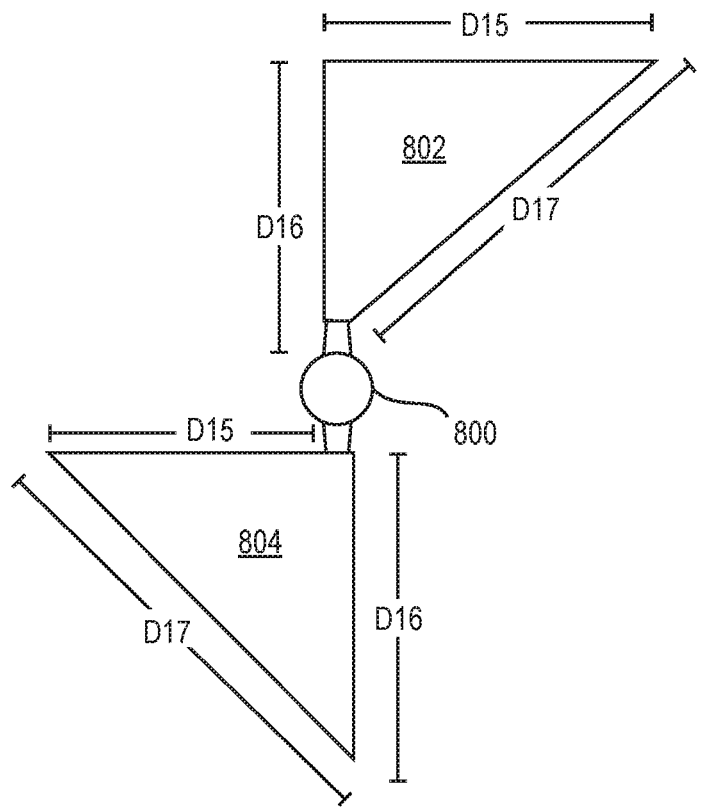
FIG. 9B shows a side view of the aerodynamically shaped blades 802 and 804.

FIG. 9A shows a close up side view of the embodiment of FIG. 8. Blades 802 and 804 may have a width D13 of approximately ⅛ of an inch. The blades 802 and 804 may be spaced apart on the shaft 800 in a horizontal direction to the shaft 800 by a gap distance D14 in the range of approximately 1 to 3 inches and ideally 2 inches. FIG. 9B shows a side view of the blades 802 and 804. Blades 802 and 804 have a wing foil shape with dimension D15 of approximately 3 inches, D16 of approximately 3 inches and D17 of approximately 3 inches.

Note that the voltages and currents specified herein are for exemplary purposes only for operation of the charging system 200. If the embodiments described herein are used in a country outside the United States, the voltages and amps could be adjusted for operation for the standards of use in these countries.

The electric battery charger system and method 200 disclosed herein may be used in the car of the future. As disclosed herein, the system and method will reduce air pollution by reducing by a significant amount. Money saved on electric bills where we have to hook the car up to a charging unit and can be spent on other necessities.

In addition to electric vehicle applications, the electric battery charger system 200 may be used in as a standalone, self-contained charging system. It may also be used for hybrid vehicles, trains, heavy vehicles (e.g., such as forklifts, buses, large trucks, tanks, personal carriers), golf carts, airplanes, boats, space station generators, NASA rovers, and portable generators (e.g., construction generators).

Devices that are described as in "communication" with each other or "coupled" to each other need not be in continuous communication with each other or in direct physical contact, unless expressly specified otherwise. On the contrary, such devices need only transmit to each other as necessary or desirable, and may actually refrain from exchanging data most of the time. For example, a machine in communication with or coupled with another machine via the Internet may not transmit data to the other machine for long period of time (e.g. weeks at a time). In addition, devices that are in communication with or coupled with each other may communicate directly or indirectly through one or more intermediaries.

It should be noted that the recitation of ranges of values in this disclosure are merely intended to serve as a shorthand method of referring individually to each separate value falling within the range, unless otherwise indicated herein, and each separate value is incorporated into the specification as if it were individually recited herein. Therefore, any given numerical range shall include whole and fractions of numbers within the range. For example, the range "1 to 10" shall be interpreted to specifically include whole numbers between 1 and 10 (e.g., 1, 2, 3, . . . 9) and non-whole numbers (e.g., 1.1, 1.2, . . . 1.9). In addition, the words "about" or "approximately" preceding a value shall mean a derivation from the value of plus or minus two percent (2%).

The definitions of the words or elements of the claims shall include not only the combination of elements which are literally set forth, but all equivalent structure, material or acts for performing substantially the same function in substantially the same way to obtain substantially the same result.

Although process (or method) steps may be described or claimed in a particular sequential order, such processes may be configured to work in different orders. In other words, any sequence or order of steps that may be explicitly described or claimed does not necessarily indicate a requirement that the steps be performed in that order unless specifically indicated. Further, some steps may be performed simultaneously despite being described or implied as occurring non-simultaneously (e.g., because one step is described after the other step) unless specifically indicated. Where a process is described in an embodiment the process may operate without any user intervention.

Specific details are given in the description to provide a thorough understanding of the embodiments. However, embodiments may be practiced without these specific details. For example, well-known processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Accordingly, the above description does not limit the scope of the disclosure.

What is claimed is:

1. An electric battery charger comprising:
   a motor configured to produce rotations in a first shaft in the range of approximately 600 to 1800 rotations per minute (rpm) with an input of approximately 1.5 volts;
   the first shaft configured to turn a first coupler;
   a second shaft configured to be turned by a second coupler;
   an elastic third coupler located between the first and second couplers to form an interlocking configuration with first blades so that that first mounted magnets are configured to repel and drive second mounted magnets; and
   a generator coupled to the second shaft and configured to produce approximately 60 volts.

2. An electric battery charger comprising:
   a motor configured to produce rotations in a first shaft in the range of approximately 600 to 1800 rotations per minute (rpm) with an input of approximately 1.5 volts;
   the first shaft configured to turn a first fan having a first set of blades with first mounted magnets;
   a second shaft configured to be turned by a second fan having a second set of blades each with second mounted magnets, wherein the second set of blades are positioned in an interlocking, non-contact configuration with the first set of blades so that that first mounted magnets are configured to repel and drive the second mounted magnets; and
   a generator coupled to the second shaft and configured to produce approximately 60 volts.

3. The charger of claim 2, wherein the first and second set of fan blades are aerodynamically shaped with a twisting, turning shape.

4. The charger of claim 2, wherein power is received at the motor from an auxiliary car battery.

5. The charger of claim 2, wherein power is received at the motor from a DC to DC converter.

6. The charger of claim 2, further comprising:
   a controller capable of monitoring and controlling the speed of the motor.

7. The charger of claim 2, wherein the first set of blades are shaped to create airflow towards the motor and the second set of blades are shaped to create airflow towards the generator.

8. The charger of claim 2, wherein first shaft has a first square shaped end and the second shaft has a second square shaped end.

9. The charger of claim 2, wherein the first and second fans further comprise:
   a first hub with a first internal, square shaped center which is integrally coupled to the first fan blades and is configured to be mounted on the first square shaped end of the first shaft; and
   a second hub with a second internal, square shaped center which is integrally coupled to the second fan blades and is configured to be mounted on the first square shaped end of the first shaft.

10. The charger of claim 2, further comprising:
    an outlet configured to be connected to an electric vehicle traction battery to enable charging of the electric vehicle traction battery.

11. The charger of claim 2, wherein the first set of fan blades are four fan blades and the second set of fan blades are four fan blades.

12. The charger of claim 2, wherein the first set of fan blades and second set of fan blades each have a length of approximately 3 inches, a width of approximately ½ inches and a thickness of ⅜ inches.

13. The charger of claim 2, wherein the first set of fan blades and second set of fan blades each have a plurality of indentations to hold the first mounted magnets and second mounted magnets.

14. The charger of claim 2, wherein the first mounted magnets and second mounted magnets are mounted flush with each of the first set of fan blades and second set of fan blades.

15. The charger of claim 2, wherein each of the first set of fan blades and second set of fan blades are made from aluminum.

16. The charger of claim 2, wherein each of the first set of fan blades and second set of fan blades are made from steel.

17. The charger of claim 2, wherein the first mounted magnets and second mounted magnets each have a holding capacity of approximately 12 pounds.

18. The charger of claim 2, wherein each of the first set of fan blades is spaced approximately in a range of 2 to 3 inches from each of the second set of fan blades.

19. The charger of claim 2, wherein each of the first mounted magnets and second mounted magnets have a length of approximately 1 inch.

20. The charger of claim 2, wherein each of the first mounted magnets are mounted flush with each of the first set of fan blades and each of the second mounted magnets are mounted flush with each of the second set of fan blades.

\* \* \* \* \*